United States Patent
Zhao et al.

(10) Patent No.: US 12,484,048 B2
(45) Date of Patent: Nov. 25, 2025

(54) METHOD PERFORMED BY USER EQUIPMENT, AND USER EQUIPMENT

(71) Applicant: SHARP KABUSHIKI KAISHA, Sakai (JP)

(72) Inventors: Yinan Zhao, Shanghai (CN); Renmao Liu, Shanghai (CN); Chao Luo, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 438 days.

(21) Appl. No.: 17/762,850

(22) PCT Filed: Sep. 27, 2020

(86) PCT No.: PCT/CN2020/118054
§ 371 (c)(1),
(2) Date: Mar. 23, 2022

(87) PCT Pub. No.: WO2021/057960
PCT Pub. Date: Apr. 1, 2021

(65) Prior Publication Data
US 2022/0361204 A1    Nov. 10, 2022

(30) Foreign Application Priority Data

Sep. 29, 2019  (CN) .......................... 201910933516.4

(51) Int. Cl.
*H04W 72/1268*  (2023.01)
*H04W 72/20*    (2023.01)

(52) U.S. Cl.
CPC ....... *H04W 72/1268* (2013.01); *H04W 72/20* (2023.01)

(58) Field of Classification Search
CPC . H04W 72/1268; H04W 72/20; H04W 72/23; H04W 72/0453
See application file for complete search history.

(56) References Cited

U.S. PATENT DOCUMENTS

| | | | | |
|---|---|---|---|---|
| 10,880,753 B1* | 12/2020 | Chiang | ................ | H04L 1/0009 |
| 2019/0215809 A1* | 7/2019 | Yang | ................... | H04L 25/0204 |
| 2020/0037245 A1* | 1/2020 | Lu | ......................... | H04L 5/0094 |
| 2020/0120642 A1* | 4/2020 | Hwang | .................... | H04L 5/005 |
| 2020/0120680 A1* | 4/2020 | Hwang | ..................... | H04L 1/00 |
| 2020/0260304 A1* | 8/2020 | Zhou | ................ | H04W 52/0235 |

(Continued)

OTHER PUBLICATIONS

3GPP TSG RAN WG1 Meeting AH 1801 R1-1800379 Vancouver, Canada, Jan. 22-26, 2018 (Year: 2018).*

(Continued)

*Primary Examiner* — Atique Ahmed
(74) *Attorney, Agent, or Firm* — ScienBiziP, P.C.

(57) ABSTRACT

Provided in the present invention are a method performed by user equipment and user equipment. The method includes: receiving first configuration information comprising configured grant information and transmitted by a base station gNB; receiving second configuration information transmitted by the base station gNB; and determining a correspondence between a bitmap of new radio uplink frequency domain resource allocation type 0 and frequency domain resource configuration information frequencyDomainAllocation.

3 Claims, 5 Drawing Sheets

(56) References Cited

U.S. PATENT DOCUMENTS

2020/0275485 A1* 8/2020 Babaei .............. H04W 74/0808
2021/0168801 A1* 6/2021 Wang .................... H04W 72/23

OTHER PUBLICATIONS

MCC Support, "Final Report of 3GPP TSG RAN WG1 #96b v1.0.0 (Xi'an, China, Apr. 8-12, 2019)", R1-1905921, 3GPP TSG RAN WG1 Meeting #97, Reno, USA, May 13-17, 2019.
Vodafone, "New SID: Study on NR V2X", RP-181480, 3GPP TSG RAN Meeting #80, La Jolla, USA, Jun. 11-14, 2018.
Huawei et al., "New WID on 3GPP V2X Phase 2", RP-170798, 3GPP TSG RAN Meeting #75, Dubrovnik, Croatia, Mar. 6-9, 2017.
LG Electronics et al., "New WI proposal: Support for V2V services based on LTE sidelink", RP-152293, 3GPP TSG RAN Meeting #70, Sitges, Spain, Dec. 7-10, 2015.
Qualcomm Incorporated, "Work Item Proposal for Enhanced LTE Device to Device Proximity Services", RP-142311, 3GPP TSG RAN Meeting #66, Maui, USA, Dec. 8-11, 2014.
Qualcomm Incorporated, "Work item proposal on LTE Device to Device Proximity Services", RP-140518, 3GPP TSG RAN Meeting #63, Fukuoka, Japan, Mar. 3-6, 2014.
Guangdong Oppo Mobile Telecom, "Bandwidth part configuration and frequency resource allocation", R1-1710164, 3GPP TSG RAN WG1 NR Ad-Hoc#2, Qingdao, P.R. China Jun. 27-30, 2017.
Huawei et al., "Discussion on NB-IoT coexistence with NR", R1-1808112, 3GPP TSG RAN WG1 Meeting #94, Gothenburg, Sweden, Aug. 20-24, 2018.
NTT Docomo, Inc., "Offline summary for AI 7.3.3.4 UL data transmission procedure", R1-1801080, 3GPP TSG RAN WG1 NR Ad Hoc Meeting, Vancouver, Canada, Jan. 22-26, 2018.
Sharp, "Correction on resource allocation for uplink transmission with configured grant Type 1", R1-1910920, 3GPP TSG-RAN1 Meeting #98bis, Chongqing, China, Oct. 14-20, 2019.
LG Electronics, "Remaining issues on resource allocation", R1-1800379, 3GPP TSG RAN WG1 Meeting AH 1801, Vancouver, Canada, Jan. 22-26, 2018, Jan. 13, 2018.
NTT Docomo, Inc., "Offline summary for UL data transmission procedure", R1-1809767, 3GPP TSG RAN WG1 Meeting #94, Gothenburg, Sweden, Aug. 20-24, 2018, Aug. 22, 2018.

* cited by examiner

METHOD PERFORMED BY USER EQUIPMENT, AND USER EQUIPMENT

TECHNICAL FIELD

The present invention relates to the technical field of wireless communications, and in particular to a method performed by user equipment, and corresponding user equipment.

BACKGROUND

In Rel-15 NR, transmission of a physical uplink shared channel (PUSCH) may be dynamically scheduled by an uplink grant (UL grant) in downlink control information (DCI); PUSCH transmission may also refer to semi-static scheduling, which includes a type 1 configured grant (configured grant type 1) and a type 2 configured grant (configured grant type 2).

For dynamically scheduled and semi-statically scheduled PUSCH transmission, two frequency domain resource allocation types are supported in Rel-15 NR. 1) Frequency domain resource allocation type 0 (uplink resource allocation type 0): the resource allocation type is a resource allocation type based on bitmap indication. 2) Frequency domain resource allocation type 1 (uplink resource allocation type 1): in the resource allocation type, a base station schedules, in a BWP, a set of consecutive RBs for UE, and resources are scheduled by means of a resource indication value (RIV).

Solutions of the present patent comprise a method used by the user equipment to determine a bitmap in frequency domain resource allocation type 0 in the case of the type 1 configured grant.

In conventional cellular networks, all communication needs to be forwarded via base stations. By contrast, D2D communication (device-to-device communication, device-to-device direct communication) refers to a direct communication method between two pieces of user equipment without forwarding via a base station or a core network. A research project on the use of LTE equipment to implement proximity D2D communication services was approved at the 3rd Generation Partnership Project (3GPP) RAN #63 plenary meeting in March 2014 (see Non-Patent Document 1). Functions introduced in the LTE Release 12 D2D include:
1) a discovery function between proximate devices in an LTE network coverage scenario;
2) a direct broadcast communication function between proximate devices; and
3) support for unicast and groupcast communication functions at higher layers.

A research project on enhanced LTE eD2D (enhanced D2D) was approved at the 3GPP RAN #66 plenary meeting in December 2014 (see Non-Patent Document 2). Main functions introduced in the LTE Release 13 eD2D include:
1) a D2D discovery in out-of-coverage and partial-coverage scenarios; and
2) a priority handling mechanism for D2D communication.

Based on the design of the D2D communication mechanism, a V2X feasibility research project based on D2D communication was approved at the 3GPP RAN #68 plenary meeting in June 2015. V2X stands for Vehicle to Everything, and intends to implement information exchange between a vehicle and all entities that may affect the vehicle, for the purpose of reducing accidents, alleviating traffic congestion, reducing environmental pollution, and providing other information services. Application scenarios of V2X mainly include four aspects:
1) V2V, Vehicle to Vehicle, i.e., vehicle-to-vehicle communication;
2) V2P, Vehicle to Pedestrian, i.e., a vehicle transmits alarms to a pedestrian or a non-motorized vehicle;
3) V2N: Vehicle to Network, i.e., a vehicle is connected to a mobile network;
4) V2I: Vehicle to Infrastructure, i.e., a vehicle communicates with a road infrastructure.

3GPP divides the research and standardization of V2X into three stages. The first stage was completed in September 2016, and was mainly focused on V2V and based on LTE Release 12 and Release 13 D2D (also known as sidelink communication), that is, the development of proximity communication technologies (see Non-Patent Document 3). V2X stage 1 introduced a new D2D communication interface referred to as PC5 interface. The PC5 interface is mainly intended to address the issue of cellular Internet of Vehicle (IoV) communication in high-speed (up to 250 km/h) and high-node density environments. Vehicles can exchange information such as position, speed, and direction through the PC5 interface, that is, the vehicles can communicate directly through the PC5 interface. Compared with the proximity communication between D2D devices, functions introduced in LTE Release 14 V2X mainly include:
1) higher density DMRS to support high-speed scenarios;
2) introduction of sub-channels to enhance resource allocation methods; and
3) introduction of a user equipment sensing mechanism with semi-persistent scheduling.

The second stage of the V2X research project belonged to the LTE Release 15 research category (see Non-Patent Document 4). Main features introduced included high-order 64QAM modulation, V2X carrier aggregation, short TTI transmission, as well as feasibility study of transmit diversity.

The corresponding third stage, V2X feasibility research project based on 5G NR network technologies (see Non-Patent Document 5), was approved at the 3GPP RAN #80 plenary meeting in June 2018.

At the 3GPP RAN 1 #96bis meeting in April 2019 (see Non-Patent Document 6), the following meeting conclusions were reached regarding semi-persistent scheduled transmission in sidelink transmission mode 1:

In NR sidelink communication, transmission mode 1 supports sidelink transmission based on an NR type 1 configured grant and an NR type 2 configured grant. The configured grant (of type 1, or type 2) provides a series of periodic resources for the sidelink transmission.

The solutions of the present invention also include a method for determining an HARQ process ID when sidelink user equipment uses resources of the configured grant to perform transmission of the sidelink communication in the NR sidelink communication.

PRIOR ART DOCUMENT

Non-Patent Documents

Non-Patent Document 1: RP-140518, Work item proposal on LTE Device to Device Proximity Services
Non-Patent Document 2: RP-142311, Work Item Proposal for Enhanced LTE Device to Device Proximity Services
Non-Patent Document 3: RP-152293, New WI proposal: Support for V2V services based on LTE sidelink Non-Patent Document 4: RP-170798, New WID on 3GPP V2X Phase 2

Non-Patent Document 5: RP-181480, New SID Proposal: Study on NR V2X

Non-Patent Document 6: RAN 1 #96bis, Chairman notes, section 7.2.4.2.1

SUMMARY OF INVENTION

In order to address at least part of the aforementioned issues, the present invention provides a method performed by user equipment, and user equipment.

According to a first aspect of the present invention, a method performed by user equipment is provided, and includes: receiving first configuration information comprising configured grant information and transmitted by a base station gNB; receiving second configuration information transmitted by the base station gNB; and determining a correspondence between a bitmap of new radio uplink frequency domain resource allocation type 0 and frequency domain resource configuration information frequencyDomainAllocation.

In the above method, it is possible that in the step of receiving first configuration information comprising configured grant information and transmitted by a base station gNB, the first configuration information comprising the configured grant information is transmitted by a radio resource control (RRC) information element ConfigturedGranmConfig; and the first configuration information includes resource block group (RBG) size configuration indication information rbg-Size; and the first configuration information includes resource allocation type configuration indication information resourceAllocation; and the first configuration information includes a higher-layer parameter rrc-ConfiguredUplinkGrant, or the first configuration information indicates that a configured grant is a new radio type 1 configured grant; in the step of receiving second configuration information transmitted by the base station gNB, the second configuration information comprises configuration information of an uplink bandwidth part (BWP); and the second configuration information comprises carrier offset configuration information offsetToCarrier; and the configuration information of the uplink BWP comprises location and bandwidth configuration information locationAndBandwidth of the uplink BWP; and the user equipment determines, according to the second configuration information, a number $N_{BWP,i}^{start}$ of a starting common resource block (CRB) of the uplink BWP and the number $N_{BWP,i}^{size}$ of CRBs comprised in the uplink BWP; and the user equipment determines, according to the $N_{BWP,i}^{size}$ and the rbg-Size, a number P of resource blocks (RBs) comprised in a Nominal RBG; and the user equipment determines a number $N_{RBG}$ of RBGs according to the $N_{BWP,i}^{size}$, the $N_{BWP,i}^{start}$, and the P; and the $N_{RBG}=\lceil(N_{BWP,i}^{size}+(N_{BWP,i}^{start} \bmod P))/P\rceil$.

In the above method, it is possible that the resource allocation type configuration indication information resourceAllocation is configured as resourceAllocationType0, or the resource allocation type configuration indication information indicates that a resource allocation type is new radio uplink frequency domain resource allocation type 0.

In the above method, it is possible that the higher-layer parameter rrc-ConfiguredUplinkGrant comprises the frequency domain resource configuration information frequencyDomainAllocation.

In the above method, it is possible that the frequency domain resource configuration information frequencyDomainAllocation has a length of 18 bits, or the frequency domain resource configuration information frequencyDomainAllocation is a bit string having a length equal to 18 bits.

In the above method, it is possible that $N_{RBG}$ is less than or equal to 18.

In the above method, it is possible that in the step of determining a correspondence between a bitmap of new radio uplink frequency domain resource allocation type 0 and frequency domain resource configuration information frequencyDomainAllocation, frequency domain resource allocation or the bitmap of new radio uplink frequency domain resource allocation type 0 is least $N_{RBG}$ bits of the frequency domain resource configuration information frequencyDomainAllocation.

In the above method, it is possible that a physical uplink shared channel (PUSCH) is transmitted according to the frequency domain resource allocation or the bitmap of new radio uplink frequency domain resource allocation type 0.

According to a second aspect of the present invention, user equipment is provided, and comprises: a processor; and a memory storing instructions, where when executed by the processor, the instructions execute the above method.

BRIEF DESCRIPTION OF THE DRAWINGS

The above and other features of the present invention will be more apparent from the following detailed description in combination with the accompanying drawings, in which.

DETAILED DESCRIPTION

Figure 1:
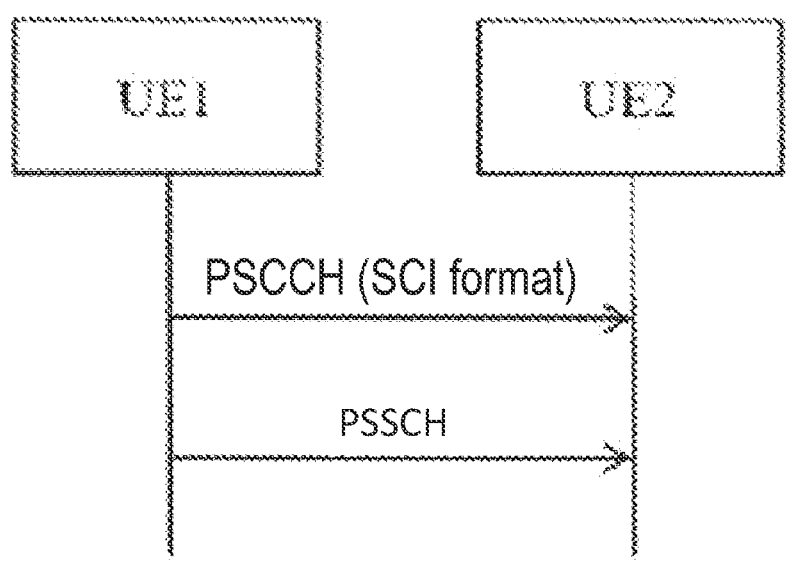
FIG. 1 is a schematic diagram showing sidelink communication of LTE V2X UE.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, a 5G mobile communication system and its later evolved versions are used as exemplary application environments to set forth a plurality of embodiments according to the present invention in detail. However, it is to be noted that the present invention is not limited to the following implementations, but is applicable to many other wireless communication systems, such as a communication system after 5G and a 4G mobile communication system before 5G.

Some terms involved in the present invention are described below. Unless otherwise specified, the terms used in the present invention adopt the definitions herein. The terms given in the present invention may vary in LTE, LTE-Advanced, LTE-Advanced Pro, NR, and subsequent communication systems, but unified terms are used in the present invention, when applied to a specific system, the terms may be replaced with terms used in the corresponding system.

3GPP: 3rd Generation Partnership Project
LTE: Long Term Evolution
NR: New Radio
PDCCH: Physical Downlink Control Channel
DCI: Downlink Control Information
PDSCH: Physical Downlink Shared Channel
UE: User Equipment
eNB: evolved NodeB, evolved base station
gNB: NR base station
TT: Transmission Time Interval
OFDM: Orthogonal Frequency Division Multiplexing
C-RNTI: Cell Radio Network Temporary Identifier
CSI: Channel State Indicator
HARQ: Hybrid Automatic Repeat Request
CSI-RS: CSI-Reference Signal, channel state measurement reference signal
CRS: Cell Reference Signal
PUCCH: Physical Uplink Control Channel
PUSCH: Physical Uplink Shared Channel
UL-SCH: Uplink Shared Channel
CG: Configured Grant
Sidelink: Sidelink communication
SCI: Sidelink Control Information
PSCCH: Physical Sidelink Control Channel
MCS: Modulation and Coding Scheme
RB: Resource Block
CRB: Common Resource Block
CP: Cyclic Prefix
PRB: Physical Resource Block
PSSCH: Physical Sidelink Shared Channel
FDM: Frequency Division Multiplexing
RRC: Radio Resource Control
RSRP: Reference Signal Receiving Power
SRS: Sounding Reference Signal
DMRS: Demodulation Reference Signal
CRC: Cyclic Redundancy Check
PSDCH: Physical Sidelink Discovery Channel
PSBCH: Physical Sidelink Broadcast Channel
SFI: Slot Format Indication
TDD: Time Division Duplexing
FDD: Frequency Division Duplexing
SIB1: System Information Block Type 1
SLSS: Sidelink Synchronization Signal
PSSS: Primary Sidelink Synchronization Signal
SSSS: Secondary Sidelink Synchronization Signal
PCI: Physical Cell ID
PSS: Primary Synchronization Signal
SSS: Secondary Synchronization Signal
BWP: Bandwidth Part
GNSS: Global Navigation Satellite System
SFN: System Frame Number (radio frame number)
DFN: Direct Frame Number
IE: Information Element
SSB: Synchronization Signal Block
EN-DC: EUTRA-NR Dual Connection
MCG: Master Cell Group
SCG: Secondary Cell Group
PCell: Primary Cell
SCell: Secondary Cell
PSFCH: Physical Sidelink Feedback Channel
SPS: Semi-Persistent Scheduling
TA: Timing Advance
RBG: Resource Block Group
MSB: Most Significant Bit
LSB: Least Significant Bit The following is a description of the prior art associated with the solution of the present invention. Unless otherwise specified, the same terms in the specific embodiments have the same meanings as in the prior art.

It is worth pointing out that the V2X and sidelink mentioned in the description of the present invention have the same meaning. The V2X herein can also mean sidelink; similarly, the sidelink herein can also mean V2X, and no specific distinction and limitation will be made in the following text.

The resource allocation mode of V2X (sidelink) communication and the transmission mode of V2X (sidelink) communication in the description of the present invention can be replaced equivalently. The resource allocation mode involved in the description can mean transmission mode, and the transmission mode involved can mean resource allocation mode.

The resource block (RB), the common resource block (CRB), and the physical resource block (PRB) involved in the description of the present invention all refer to 12 consecutive subcarriers in the frequency domain. For example, for a subcarrier spacing of 15 kHz, the RB, the CRB, and the PRB occupy 180 kHz in the frequency domain.

In the description of the present invention, [a] refers to rounding up a, and a mod b refers to a remainder obtained after a is divided by b.

In the description of the present invention, an uplink resource may refer to a sidelink resource, and a sidelink resources may refer to an uplink resource. Specifically, an uplink slot may refer to a sidelink (available) slot, and an uplink symbol may refer to a sidelink symbol.

The PSCCH in the description of the present invention is used to carry SCI. The PSSCH associated with or relevant to or corresponding to or scheduled by PSCCH involved in the description of the present invention has the same meaning, and all refer to an associated PSSCH or a corresponding PSSCH. Similarly, the PSCCH associated with or relevant to or corresponding to PSSCH involved in the description has the same meaning, and all refer to an associated PSCCH or a corresponding PSCCH. It is worth pointing out that the PSCCH associated with or relevant to or corresponding to PSSCH may be one PSCCH or two PSCCHs. When the PSCCH associated with or relevant to or corresponding to PSSCH includes two PSCCHs (or, two pieces of SCI), in the description of this patent, the two are referred to as a PSCCH carrying first-level SCI and a PSCCH carrying second-level SCI.

Numerology in NR (Comprising NR Sidelink) and Slot in NR (Comprising NR Sidelink)

The numerology comprises two meanings of a subcarrier spacing and a cyclic prefix (CP) length. NR supports five subcarrier spacings, which are respectively 15 kHz, 30 kHz, 60 kHz, 120 kHz, and 240 kHz (corresponding top μ=0, 1, 2, 3, 4). Table 4.2-1 shows transmission numerology supported, specifically as follows.

TABLE 4.2-1

| Subcarrier Spacings Supported by NR | | |
|---|---|---|
| μ | $\Delta f = 2^{\mu} \cdot 15 [kHz]$ | CP (cyclic prefix) |
| 0 | 15 | Normal |
| 1 | 30 | Normal |

TABLE 4.2-1-continued

Subcarrier Spacings Supported by NR

| μ | Δf = $2^μ$ · 15[kHz] | CP (cyclic prefix) |
|---|---|---|
| 2 | 60 | Normal, extended |
| 3 | 120 | Normal |
| 4 | 240 | Normal |

Only when μ=2, namely, in the case of a 60-kHz subcarrier spacing, an extended CP is supported, and only a normal CP is supported in the case of other subcarrier spacings. For a normal CP, each slot includes 14 OFDM symbols; for an extended CP, each slot includes 12 OFDM symbols. For μ=0, namely, a 15-kHz subcarrier spacing, one slot=1 ins; for μ=1, namely, a 30-kHz subcarrier spacing, one slot=0.5 ins; for μ=2, namely, a 60-kHz subcarrier spacing, one slot=0.25 ins, and so on.

NR and LTE have the same definition for a subframe, and the subframe denotes 1 ms. For a subcarrier spacing configuration μ, a slot number in 1 subframe (1 ms) may be denoted as $n_s^μ$, and ranges from 0 to $N_{slot}^{subframe,μ}-1$; a slot number in 1 system frame (having a duration of 10 ms) may be denoted as $n_{s,f}^μ$, and ranges from 0 to $N_{slot}^{frame,μ}-1$, where respective definitions of $N_{slot}^{subframe,μ}$ and $N_{slot}^{frame,μ}$ in different subcarrier spacings μ are shown in the following table.

TABLE 4.3.2-1 the number of symbols comprised in each slot, the number of slots comprised in each system frame, and the number of slots comprised in each subframe for the normal CP

| μ | $N_{symb}^{slot}$ | $N_{slot}^{frame, μ}$ | $N_{slot}^{subframe, μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4.3.2-2 the number of symbols comprised in each slot, the number of slots comprised in each system frame, and the number of slots comprised in each subframe for the extended CP (60 kHz)

| μ | $N_{symb}^{slot}$ | $N_{slot}^{frame, μ}$ | $N_{slot}^{subframe, μ}$ |
|---|---|---|---|
| 2 | 12 | 40 | 4 |

On an NR carrier, a system frame (or simply referred to as frame) number (SFN) ranges from 0 to 1023. The concept in which a direct system frame number DFN is introduced to sidelink communication, the number likewise ranges from 0 to 1023. The above description of the relationship between the system frame and the numerology can likewise be applied to a direct system frame. For example, a duration of one direct system frame is likewise equal to 10 ms; for a subcarrier interval of 15 kHz, one direct system frame includes 10 slots, and so on. The DFN is applied to timing on a sidelink carrier.

NR Common Resource Block (Common RB, CRB)

A CRB is defined in regard of a numerology. For all numerologies, a center frequency of subcarrier 0 of common resource block 0 points to the same position in the frequency domain, which is referred to as a "point A".

NR Resource Grid

In a given transmission direction (denoted by x, where x=DL means downlink, and x=UL means uplink) of a carrier, a resource grid is defined for each numerology, which includes $N_{grid,x}^{size,μ}N_{sc}^{RB}$ subcarriers (i.e., $N_{grid,x}^{size,μ}$ resource blocks (RBs), each resource block including $N_{sc}^{RB}$ subcarriers) in the frequency domain, and includes $N_{symb}^{subframe,μ}$ OFDM symbols ($N_{symb}^{subframe,μ}$ represents the number of OFDM symbols in one subframe, and the specific value is related to μ) in the time domain, where $N_{sc}^{RB}$ represents the number of subcarriers in one resource block (RB), which satisfies $N_{sc}^{RB}=12$. The lowest numbered common resource block (CRB) $N_{grid,x}^{start,μ}$ of the resource grid is configured by a higher-layer parameter offsetToCarrier, the number $N_{grid,x}^{size,μ}$ of frequency domain resource blocks is configured by a high-layer parameter carrierBandwidth. For a given numerology and higher-layer parameter offsetToCarrier, a gNB configures a cell-specific common offsetToCarrier in ServingCellConfigCommon IE through dedicated signaling. Specifically, ServingCellConfigCommon includes a higher-layer parameter downlinkConfgCommon, and downlinkConfigCommon includes configuration information of offsetToCarrier.

Bandwidth Part (BWP)

In NR, for each numerology, one or a plurality of bandwidth parts can be defined. Each BWP includes one or a plurality of consecutive CRBs. Assuming that a number of a certain BWP is i, a starting point $N_{BWP,i}^{start,μ}$ (or denoted by $N_{BWP,i}^{start}$) and a length $N_{BWP,i}^{size,μ}$ (or denoted by $N_{BWP,i}^{size}$) thereof need to satisfy the following relationships at the same time:

$$N_{grid,x}^{start,μ} \le N_{BWP,i}^{start,μ} < N_{grid,x}^{start,μ} + N_{grid,x}^{size,μ}$$

$$N_{grid,x}^{start,μ} < N_{BWP,i}^{size,μ} + N_{BWP,i}^{start,μ} \le N_{grid,x}^{start,μ} + N_{grid,x}^{size,μ}$$

That is, CRBs comprised in the BWP must be located in a resource grid of a corresponding numerology. $N_{BWP,i}^{start,μ}$ uses a CRB number to indicate the distance from the lowest numbered CRB of the BWP to point A, in units of RBs.

A resource block in the BWP is referred to as a physical resource block (PRB), and a number thereof is 0~$N_{BWP,i}^{size,μ}-1$, where physical resource block 0 corresponds to the lowest numbered CRB of the BWP, namely CRB $N_{BWP,i}^{start,μ}$. For a certain serving cell, the gNB configures a certain BWP by means of the following higher-layer parameters:

1) a subcarrier spacing;
2) a CP length;
3) a higher-layer parameter locationAndBandwidth indicates an offset ($RB_{start}$) of the BWP relative to a starting CRB $N_{grid,x}^{start,μ}$ of the resource grid and the number $L_{RB}$ of consecutive CRBs in the frequency domain of the BWP, which satisfies $N_{BWP,i}^{start,μ}=O_{carrier}+RB_{start}$, where $O_{carrier}$ represents offsetToCarrier, and the parameter locationAndBandwidth indicates a resource indication value (RIV). A calculation relationship of the RIV related to $L_{RB}$ and $RB_{start}$ is as follows: if $$L_{RB} - 1 \le \text{floor}\left(\frac{N_{BWP}^{size}}{2}\right),$$

then $RIV=N_{BWP}^{size}(L_{RB}-1)+RB_{start}$; otherwise, $RIV=N_{BWP}^{size}(N_{BWP}^{size}-L_{RB}+1)+(N_{BWP}^{size}-1-RB_{start})$, where $1 \le L_{RB} \le N_{BWP}^{size}-RB_{start}$, and $N_{BWP}^{size}=275$.

4) the number of the BWP;

5) BWP-common and BWP-specific parameter configurations, such as configurations of a PDCCH and a PDSCH of a downlink BWP.

NR Type 1 Configured Grant (CG)

Rel-15 NR further supports a CG-based PUSCH transmission on the basis of support for DCI dynamic PUSCH scheduling. In the description of the present invention, CG stands for configured grant. For an NR type 1 configured grant, a base station configures a CG for UE through RRC signaling. In the NR type 1 configured grant mechanism, the UE does not need to monitor DCI dynamic scheduling including a UL grant, and can use a CG configured by the base station to transmit a PUSCH. Specifically, the base station configures parameters for PUSCH transmission through RRC signaling configuredGrantConfig, and the RRC signaling configuredGrantConfig comprises rrc-ConfiguredUplinkGrant. The configured grant configuredGrantConfig comprises at least time domain resources, frequency domain resources, and resource period of a semi-persistent scheduled PUSCH. rrc-ConfiguredUplinkGrant comprises scheduling of the aforementioned time domain resources and frequency domain resources. In the type 1 CG PUSCH transmission, the UE does not need to monitor the uplink grant (UL grant) in the DCI. After the base station configures the type 1 CG (IE: configuredGrantConfig), the UE can use the configured CG resources to transmit the PUSCH.

Resource Block Group (RBG)

A resource block group (RBG) represents a set of consecutive RBs in the frequency domain. One BWP (the BWP contains $N_{BWP,i}^{size}$ RBs) includes $N_{RBG}$ RBGs (numbered sequentially from RBG #0 to RBG #($N_{RBG}$-1)). For a higher-layer parameter rbg-Size in an RRC information element pusch-Config, if rbg-Size is configured as config2, then configuration 2 is indicated, and if the parameter rbg-Size is default (or absent), then configuration 1 is indicated. A correspondence between the number of RBs comprised in a Nominal RBG and $N_{BWP,i}^{size}$, and configuration 1 or configuration 2 is shown in Table 6.1.2.2.1-1:

TABLE 6.1.2.2.1-1

| $N_{BWP,i}^{size}$ | the number P of RBs comprised in the Nominal RBG | |
|---|---|---|
| | Configuration 1 | Configuration 2 |
| 1-36 | 2 | 4 |
| 37-72 | 4 | 8 |
| 73-144 | 8 | 16 |
| 145-275 | 16 | 16 |

According to the correspondence in the above table and the specific configuration of rbg-Size, $N_{RBG}=\lceil(N_{BWP,i}^{size}+(N_{BWP,i}^{start} \mod P))/P\rceil$.

NR Uplink Frequency Domain Resource Allocation Type 0 (Uplink Resource Allocation Type 0)

In the uplink frequency domain resource allocation type 0, allocation scheduling information of the RB is an indication form of a bitmap, and the number of bits of the bitmap is $N_{RBG}$, that is, the bitmap has a length of $N_{RBG}$. Each bit of the bitmap corresponds to an RBG. If the bit is set to be 1, then it is indicated that the base station has allocated the corresponding RBG for PUSCH transmission, and if the bit is set to be 0, then it is indicated that the base station has not allocated the corresponding RBG for PUSCH transmission. The most significant bit (MSB) of the bitmap corresponds to RBG #0, the least significant bit (LSB) of the bitmap corresponds to RBG #($N_{RBG}$-1), and so on. That is, the order of the bitmap sequentially correspond to RBG #0 to RBG #($N_{RBG}$-1).

Sidelink Communication Scenario

1) Out-of-coverage sidelink communication: Both pieces of UE performing sidelink communication are out of network coverage (for example, the UE cannot detect any cell that meets a "cell selection criterion" on a frequency at which sidelink communication needs to be performed, and that means the UE is out of network coverage).

2) In-coverage sidelink communication: Both pieces of UE performing sidelink communication are in network coverage (for example, the UE detects at least one cell that meets a "cell selection criterion" on a frequency at which sidelink communication needs to be performed, and that means the UE is in network coverage).

3) Partial-coverage sidelink communication: One of two pieces of UE performing sidelink communication is out of network coverage, and the other is in network coverage.

From the perspective of a UE side, the UE has only two scenarios, out-of-coverage and in-coverage. Partial-coverage is described from the perspective of sidelink communication.

Basic Procedure of LTE V2X (Sidelink) Communication

FIG. 1 is a schematic diagram showing sidelink communication of LTE V2X UE. First, UE1 transmits to UE2 sidelink control information (SCI format 1), which is carried by a physical layer channel PSCCH. The SCI format 1 includes scheduling information of a PSSCH, such as frequency domain resources and the like of the PSSCH. Secondly, the UE1 transmits to the UE2 sidelink data, which is carried by the physical layer channel PSSCH. The PSCCH and the corresponding PSSCH are frequency division multiplexed, that is, the PSCCH and the corresponding PSSCH are located in the same subframe in the time domain and are located on different PRBs in the frequency domain. Specific design methods of the PSCCH and the PSSCH are as follows:

1) The PSCCH occupies one subframe in the time domain and two consecutive PRBs in the frequency domain. Initialization of a scrambling sequence uses a predefined value 510. The PSCCH may carry the SCI format 1, where the SCI format 1 at least includes frequency domain resource information of the PSSCH. For example, for a frequency domain resource indication field, the SCI format 1 indicates a starting sub-channel number and the number of consecutive sub-channels of the PSSCH corresponding to the PSCCH.

2) The PSSCH occupies one subframe in the time domain, and uses frequency division multiplexing (FDM) with the corresponding PSCCH. The PSSCH occupies one or a plurality of consecutive sub-channels in the frequency domain. The sub-channel represents $n_{subCHsize}$ consecutive PRBs in the frequency domain. $n_{subCHsize}$ is configured by an RRC parameter, and a starting sub-channel and the number of consecutive sub-channels are indicated by the frequency domain resource indication field of the SCI format 1.

Resource Allocation Mode (Transmission Mode 3/4) of LTE V2X

Figure 2:
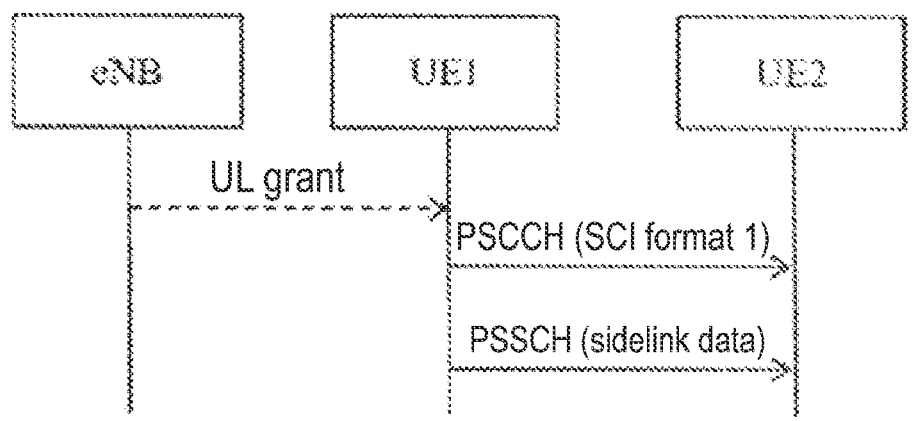
FIG. 2 is a schematic diagram showing a resource allocation mode of LTE V2X.

FIG. 2 shows two resource allocation modes of LTE V2X, which are referred to as base station scheduling-based resource allocation (Transmission Mode 3) and UE sensing-based resource allocation (Transmission Mode 4), respectively. In LTE V2X, in eNB network coverage, a base station can configure, through UE-level dedicated RRC signaling SL-V2X-ConfigDedicated, a resource allocation mode of UE, or referred to as a transmission mode of the UE, which is specifically as follows:

1) Base station scheduling-based resource allocation mode (Transmission Mode 3): the base station scheduling-based resource allocation mode means that frequency domain resources used in sidelink communication are from scheduling of the base station. Transmission Mode 3 includes two scheduling modes, which are dynamic scheduling and semi-persistent scheduling (SPS), respectively. For dynamic scheduling, a UL grant (DCI format 5A) includes the frequency domain resources of the PSSCH, and a CRC of a PDCCH or an EPDCCH carrying the DCI format 5A is scrambled by an SL-V-RNTI. For semi-persistent scheduling (SPS), the base station configures one or a plurality of (at most 8) configured grants through IE: SPS-ConfigSL-r14, and each configured grant contains a grant index and a resource period of the grant. The UL grant (DCI format 5A) includes the frequency domain resource of the PSSCH, indication information (3 bits) of the grant index, and indication information of SPS activation or release (or deactivation). The CRC of the PDCCH or the EPDCCH carrying the DCI format 5A is scrambled by an SL-SPS-V-RNTI.

Specifically, when RRC signaling SL-V2X-ConfigDedicated is set to scheduled-r14, it indicates that the UE is configured in the base station scheduling-based transmission mode. The base station configures the SL-V-RNTI or the SL-SPS-V-RNTI via RRC signaling, and transmits the UL grant to the UE through the PDCCH or the EPDCCH (DCI format 5A, the CRC is scrambled by the SL-V-RNTI or the SL-SPS-V-RNTI). The UL grant includes at least scheduling information of the PSSCH frequency domain resource in sidelink communication. When the UE successfully detects the PDCCH or the EPDCCH scrambled by the SL-V-RNTI or the SL-SPS-V-RNTI, the UE uses a PSSCH frequency domain resource indication field in the UL grant (DCI format 5A) as PSSCH frequency domain resource indication information in a PSCCH (SCI format 1), and transmits the PSCCH (SCI format 1) and a corresponding PSSCH. For SPS in Transmission Mode 3, the UE receives, on a downlink subframe n, the DCI format 5A scrambled by the SL-SPS-V-RNTI. If the DCI format 5A includes the indication information of SPS activation, then the UE determines frequency domain resources of the PSSCH according to the indication information in the DCI format 5A, and determines time domain resources of the PSSCH (transmission subframes of the PSSCH) according to information such as the subframe n and the like.

2) UE sensing-based resource allocation mode (Transmission Mode 4): the UE sensing-based resource allocation mode means that resources for sidelink communication are based on a procedure of sensing of a candidate available resource set performed by the UE. When the RRC signaling SL-V2X-ConfigDedicated is set to ue-Selected-r14, it indicates that the UE is configured in the UE sensing-based transmission mode. In the UE sensing-based transmission mode, the base station configures an available transmission resource pool, and the UE determines a PSSCH sidelink transmission resource in the transmission resource pool according to a certain rule (for a detailed description of the procedure, see the LTE V2X UE sensing procedure section), and transmits a PSCCH (SCI format 1) and a corresponding PSSCH.

HARQ in NR Sidelink

Existing LTE V2X communication only supports broadcast communication at a physical layer. Broadcast communication is widely applied in scenarios such as cellular communication where a base station transmits a system message to UE in a cell. The design goals of NR V2X include support for unicast communication and groupcast communication at a physical layer. Unicast communication refers to communication between transmitting user equipment (UE) and single receiving user equipment. Groupcast communication generally means that a group of UE are assigned the same identity (ID), among which UE transmits V2X data to other UE in the group, and receives V2X data transmitted by other UE in the group. It is worth pointing out that, in order to better improve the reliability of transmission and improve the spectrum efficiency, an HARQ retransmission mechanism is usually included in unicast communication and groupcast communication. HARQ stands for hybrid automatic repeat request, which can provide an error correction function and implement fast repeat request, and is widely applied in wireless data communications. HARQ feedback includes an HARQ ACK and an HARQ NACK. Among them, the HARQ ACK means that receiving UE correctly receives and decodes data of transmitting UE and therefore feeds back an HARQ ACK; the HARQ NACK means that the receiving UE does not correctly receive and decode the data of the transmitting UE. When the receiving UE feeds back an HARQ NACK, the transmitting UE may retransmit corresponding data to ensure improvement in the reliability of data communication. In NR V2X, the HARQ ACK and the HARQ NACK are carried by a Physical Sidelink Feedback Channel (PSFCH). In NR sidelink, an HARQ process is used to identify transmission of one transport block (TB). Each HARQ process possesses a unique identifier, and the identifier is referred to as an HARQ process ID. The UE creates a buffer region (soft buffer) for each HARQ process, for storing transmission of one TB.

Method for Indicating and Determining NR TDD Configuration Information

An NR base station gNB configures cell-level TDD configuration information through TDD-UL-DL-Config-Common in SIB1, including:

a reference subcarrier spacing pre; and a higher-layer parameter pattern/(the information element is required, and represents TDD configuration pattern 1, the same below), including the following higher-layer parameters:

configuration period P (ms);

the number $d_{slots}$ of downlink slots, where the downlink slot contains only a downlink OFDM symbol (may be referred to as a DL-only slot);

the number $d_{sym}$ of downlink OFDM symbols;

the number $u_{slots}$ of uplink slots, where the uplink slot contains only an uplink OFDM symbol (may be referred to as a UL-only slot); and the number $u_{sym}$ of uplink OFDM symbols.

The period of the above configuration information is P ms, and corresponds to $S=P\times2^{\mu ref}$ consecutive slots. Among S slots, $d_{slots}$ downlink slots are at the start, and $u_{slots}$ uplink slots are located at the end of the S slots. $d_{sym}$ downlink OFDM symbols are located behind $d_{slots}$ downlink slots, and $u_{sym}$ uplink OFDM symbols are located before $u_{slots}$ uplink slots. The remaining $(S-d_{slots}-u_{slots}) \cdot N_{symbol}^{slot}-d_{sym}-u_{sym}$ OFDM symbols are X symbols (X represents a flexible symbol). In different application scenarios, the X symbol may be a downlink symbol, or an uplink symbol, or a spacing protection symbol between downlink and uplink. For a normal CP, $N_{symbol}^{slot}=14$. For an extended CP, $N_{symbol}^{slot}=12$.

TDD-UL-DL-ConfigCommon in SIB1 may comprise a higher-layer parameter pattern2 (the information element is optional, and represents TDD configuration pattern 2, the same below). Configuration information of pattern2 and the configuration information of pattern1 are in the same form (parameters of pattern2 include: a period P2, $d_{slots,2}$, $u_{slots,2}$, $d_{sym,2}$, $u_{sym,2}$), and the meaning of a corresponding parameter is the same as the meaning of a corresponding parameter of pattern1. A reference subcarrier spacing $\mu_{ref}$ is not configured repeatedly for pattern2 since the reference subcarrier spacing $\mu_{ref}$ thereof is the same as that of pattern1. The period of the above configuration information is P2 ms, and corresponds to $S2=P2\times 2^{\mu_{ref}}$ consecutive slots. Among S2 slots, $d_{slots,2}$ downlink slots are at the start, and $u_{slots,2}$ uplink slots are located at the end of the S2 slots. $d_{sym,2}$ downlink OFDM symbols are located behind the downlink slots, and $u_{sym,2}$ uplink OFDM symbols are located before the uplink slots. The remaining $(S2-d_{slots,2}-u_{slots,2}) \cdot N_{symbol}^{slot}-d_{sym,2}-u_{sym,2}$ OFDM symbols are X symbols (X represents a flexible symbol). In different application scenarios, the X symbol may be a downlink symbol, or an uplink symbol, or a spacing protection symbol between downlink and uplink. For a normal CP, $N_{symbol}^{slot}=14$. For an extended CP, $N_{symbol}^{slot}=12$.

When TDD-UL-DL-ConfigCommon comprises both pattern1 and pattern2, a configuration period of the TDD configuration information is (P+P2) ms, and comprises the above S and S2 slots (S first and then S2 in the time domain).

The periods P and P2 in the above configuration information need to meet the following conditions:
1) P is a divisor of 20, that is, P is divisible by 20, and a first time domain symbol of every 20/P periods is a first symbol of an even numbered frame;
2) P+P2 is a divisor of 20, that is, P+P2 is divisible by 20, and a first time domain symbol of every 20/(P+P2) periods is a first symbol of an even numbered frame.

A possible value range of P and P2 includes {0.5, 0.625, 1, 1.25, 2, 2.5, 5, 10} ms. The values of P and P2 also comprise 3 ms and 4 ms, which are represented by IE: dl-UL-TransmissionPeriodicity-v1530. When the base station has configured dl-UL-TransmissionPeriodicity-v1530 in pattern1/2, the UE ignores dl-UL-TransmissionPeriodicity corresponding to pattern1/2.

Sidelink Resource Pool

In sidelink communication, resources transmitted and received by the UE all belong to a resource pool. For example, for a base station scheduling-based transmission mode in sidelink communication, the base station schedules transmission resources for sidelink UE in the resource pool; alternatively, for a UE sensing-based transmission mode in sidelink communication, the UE determines a transmission resource in the resource pool.

In the description of the present invention, a configuration period (or a configuration length, or the length of a configured bitmap) of the sidelink resource pool is represented by $b_{ResourcePool}$. Optionally, the configuration period is in unit of slots. The number of slots that can be used for sidelink transmission configured in $b_{ResourcePool}$, is represented by $a_{slot}$. For example, $b_{ResourcePool}$ has a length of 40, each bit set to be 1 indicates that the same can be used for sidelink transmission (that is, the same belongs to the resource pool), $b_{ResourcePool}$ has a total of 20 bits set to be 1, and then $a_{slot}=20$.

After the UE determines time domain resources of the resource pool (for example, time domain resources in units of slots in the resource pool), slots in all resource pools are numbered continuously and in ascending order from 0. The number may be denoted as $s_q$ ($q=0, 1, \ldots, q_{max}$), where q is referred to as a logical number (or logical index) of the resource pool in the description of the present invention.

Available Resources for Sidelink Transmission

The available resources for sidelink transmission involved in the description of the present invention are a superset of the above sidelink resource pools, and the superset represents an union of resource pools of each UE. For example, the base station gNB broadcasts, in a cell, a set of available resources for sidelink transmission, and configures sidelink resource pools respectively for user equipment 1 and user equipment 2 in the available resources for sidelink transmission. The sidelink resource pools of the user equipment 1 and the user equipment 2 may or may not overlap in the time frequency resources.

The above available resources for sidelink transmission may be referred to as sidelink slot resources (sidelink slots) for short. Optionally, the base station may indicate, in the form of a bitmap, sidelink slots, or the base station may use the number of uplink slots comprised in a form the same as an NR TDD configuration pattern or the number of available slots for sidelink communication comprised in the form the same as the NR TDD configuration pattern to indicate the above available resources for sidelink transmission. For example, the base station indicates a configuration period P, P corresponding to a configuration period in TDD configuration, and indicates the number of last uplink (or sidelink available) slots in the period; then, the UE can determine the above available resources for sidelink transmission.

In the description of the present invention, a configuration period (or a configuration length, or the length of a configured bitmap) of the available resource for sidelink transmission is represented by $d_{AllSlots}$. The number of slots that can be used for sidelink transmission configured in $d_{AllSlots}$ is represented by $c_{AllSlots}$. For example, if indication is made in the form the same as the NR TDD configuration pattern, then $d_{AllSlots}=P\times 2^{\mu_{ref}}$, and $c_{SLSlots}=u_{slots}$. The present invention includes, but is not limited to, the above specific embodiments for the indication of the available resources for sidelink transmission.

Hereinafter, specific examples and embodiments related to the present invention are described in detail. In addition, as described above, the examples and embodiments described in the present disclosure are illustrative descriptions for facilitating understanding of the present invention, rather than limiting the present invention.

Embodiment 1

Figure 3:
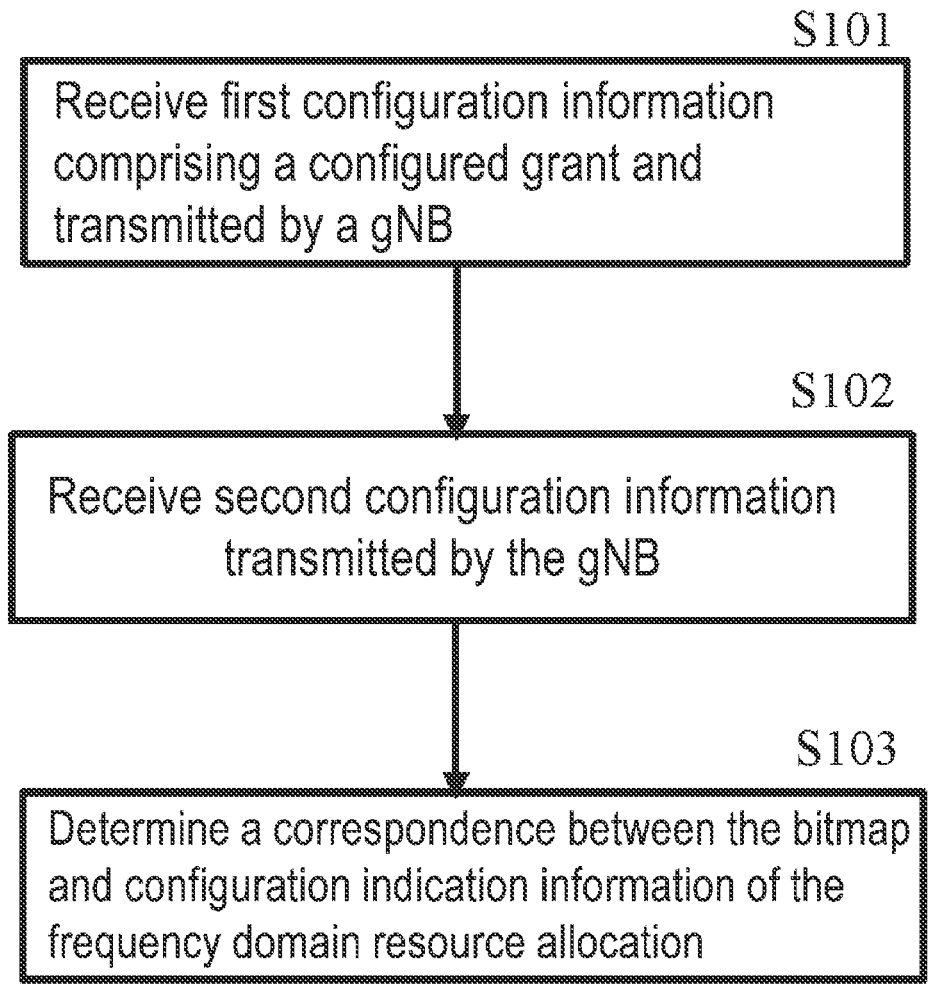
FIG. 3 is a schematic diagram showing a basic procedure of a method performed by user equipment according to Embodiment 1 and Embodiment 2 of the invention.

FIG. 3 is a schematic diagram showing a basic procedure of a method performed by user equipment according to Embodiment 1 of the present invention.

The method performed by user equipment according to Embodiment 1 of the present invention is described in detail below in conjunction with the basic procedure diagram shown in FIG. 3.

As shown in FIG. 3, in Embodiment 1 of the present invention, steps performed by the user equipment include the following steps.

In step S101, the user equipment receives first configuration information comprising configured grant information and transmitted by a base station gNB.

Optionally, the first configuration information comprising the configured grant information is transmitted by an RRC information element ConfiguredGrantConfig.

Optionally, the first configuration information includes RBG size configuration indication information rbg-Size.

Optionally, the first configuration information includes resource allocation type configuration indication information resourceAllocation. Optionally, the resource allocation type configuration indication information resourceAllocation is configured as resourceAllocationType0, or the resource allocation type configuration indication information indicates that a resource allocation type is NR uplink frequency domain resource allocation type 0.

Optionally, the first configuration information comprises a higher-layer parameter rrc-ConfiguredUplinkGrant, or the first configuration information indicates that a configured grant is an NR type 1 configured grant.

Optionally, the higher-layer parameter rrc-ConfiguredUplinkGrant comprises the frequency domain resource configuration information frequencyDomainAllocation. Optionally, the frequency domain resource configuration information frequencyDomainAllocation has a length of 18 bits, or the frequency domain resource configuration information frequencyDomainAllocation is a bit string having a length equal to 18 bits.

In step S102, the user equipment receives second configuration information transmitted by the base station gNB.

Optionally, the second configuration information comprises configuration information of an uplink BWP. Optionally, the configuration information of the uplink BWP comprises location and bandwidth configuration information locationAndBandwidth of the uplink BWP.

Optionally, the user equipment determines, according to the second configuration information, a number $N_{BWP,i}^{start}$ of a starting CRB of the uplink BWP and the number $N_{BWP,i}^{size}$ of CRBs comprised in the uplink BWP.

Optionally, the user equipment determines, according to the $N_{BWP,i}^{size}$, and/or the rbg-Size, the number P of RBs comprised in a Nominal RBG.

Optionally, the user equipment determines, according to the $N_{BWP,i}^{size}$ and/or the $N_{BWP,i}^{start}$, and/or the P, the number NRBG of RBGs. Optionally, the $$N_{RBG} = \lceil (N_{BWP,i}^{size} + (N_{BWP,i}^{start} \bmod P))/P \rceil.$$

In step S103, the user equipment determines a correspondence between a bitmap of NR uplink frequency domain resource allocation type 0 and frequency domain resource configuration information frequencyDomainAllocation.

Optionally, the number of bits of the bitmap of the NR uplink frequency domain resource allocation type 0 is equal to $N_{RBG}$. Optionally, $N_{RBG}$ is less than or equal to 18.

Optionally, an L-th bit of the frequency domain resource configuration information frequencyDomainAllocation corresponds to (or is) an L-th bit of the bitmap. Optionally, the L-th bit represents a most significant bit (MSB), or the L-th bit represents a least significant bit (LSB). The correspondence in the present invention includes but is not limited to the above two correspondences.

Embodiment 2

The method performed by user equipment according to Embodiment 2 of the present invention is described in detail below in conjunction with the basic procedure diagram shown in FIG. 3.

As shown in FIG. 3, in Embodiment 2 of the present invention, steps performed by the user equipment include the following steps.

In step S101, the user equipment receives first configuration information comprising configured grant information and transmitted by a base station gNB.

Optionally, the first configuration information comprising the configured grant information is transmitted by an RRC information element ConfiguredGrantConfig.

Optionally, the first configuration information includes RBG size configuration indication information rbg-Size.

Optionally, the first configuration information includes resource allocation type configuration indication information resourceAllocation. Optionally, the resource allocation type configuration indication information resourceAllocation is configured as resourceAllocationType0, or the resource allocation type configuration indication information indicates that a resource allocation type is NR uplink frequency domain resource allocation type 0.

Optionally, the first configuration information comprises a higher-layer parameter rrc-ConfiguredUplinkGrant, or the first configuration information indicates that a configured grant is an NR type 1 configured grant.

Optionally, the higher-layer parameter rrc-ConfiguredUplinkGrant comprises the frequency domain resource configuration information frequencyDomainAllocation. Optionally, the frequency domain resource configuration information frequencyDomainAllocation has a length of 18 bits, or the frequency domain resource configuration information frequencyDomainAllocation is a bit string having a length equal to 18 bits.

In step S102, the user equipment receives second configuration information transmitted by the base station gNB.

Optionally, the second configuration information comprises configuration information of an uplink BWP. Optionally, the configuration information of the uplink BWP comprises location and bandwidth configuration information locationAndBandwidth of the uplink BWP.

Optionally, the user equipment determines, according to the second configuration information, a number $N_{BWP,i}^{start}$ of a starting CRB of the uplink BWP and the number $N_{BWP,i}^{size}$ of CRBs comprised in the uplink BWP.

Optionally, the user equipment determines, according to the $N_{BWP,i}^{size}$, and/or the rbg-Size, the number P of RBs comprised in a Nominal RBG.

Optionally, the user equipment determines, according to the $N_{BWP,i}^{size}$, and/or the $N_{BWP,i}^{start}$, and/or the P, the number $N_{RBG}$ of RBGs. Optionally, the $$N_{RBG} = \lceil (N_{BWP,i}^{size} + (N_{BWP,i}^{start} \bmod P))/P \rceil.$$

In step S103, the user equipment determines a correspondence between a bitmap of NR uplink frequency domain resource allocation type 0 and frequency domain resource configuration information frequencyDomainAllocation.

Optionally, the number of bits of the bitmap of NR uplink frequency domain resource allocation type 0 is equal to $N_{RBG}$. Optionally, $N_{RBG}$ is less than or equal to 18.

Optionally, a most significant bit (MSB) to an $N_{RBG}$-th bit of the frequency domain resource configuration information frequencyDomainAllocation represent the bitmap; alternatively, a (19–$N_{RBG}$)-th bit to a least significant bit (LSB) of the frequency domain resource configuration information frequencyDomainAllocation indicate the bitmap; alternatively, the most significant bit (MSB) to the $N_{RBG}$-th bit of the frequency domain resource configuration information frequencyDomainAllocation sequentially correspond to $N_RBG$ bits of the bitmap; alternatively, the (19–$N_{RBG}$) bit to the least significant bit (LSB) of the frequency domain resource configuration information frequencyDomainAllocation sequentially correspond to the $N_{RBG}$ bits of the bitmap.

Embodiment 3

Figure 4:
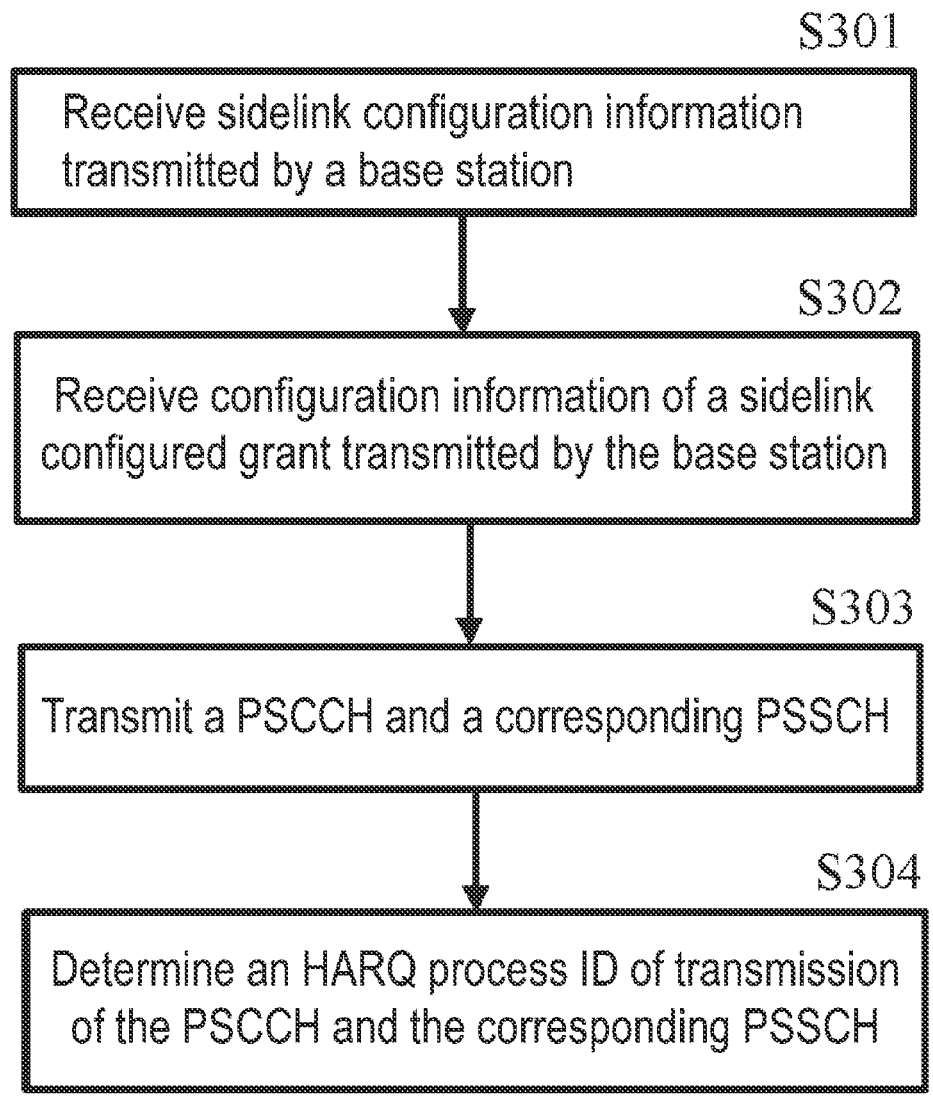
FIG. 4 is a schematic diagram showing a basic procedure of a method performed by user equipment according to Embodiment 3 of the present invention.

FIG. 4 is a schematic diagram showing a basic procedure of a method performed by user equipment according to Embodiment 3 of the present invention.

The method performed by user equipment according to Embodiment 3 of the present invention is described in detail below in conjunction with the basic procedure diagram shown in FIG. 4.

As shown in FIG. 4, in Embodiment 3 of the present invention, steps performed by the user equipment include the following steps.

In step S301, the user equipment receives sidelink configuration information transmitted by a base station gNB.

Optionally, the sidelink configuration information comprises configuration information of a sidelink resource pool. Optionally, the configuration information of the sidelink resource pool includes a first configuration period (or a first configuration length, or the length of a first configured bitmap) $b_{ResourcePool}$. Optionally, the UE determines, according to the configuration information of the sidelink resource pool, the number $a_{slot}$ of available resources (or slots) for sidelink transmission in the first configuration period $b_{ResourcePool}$.

Optionally, the sidelink configuration information comprises a second configuration period (or a second configuration length, or the length of a second configured bitmap) $d_{AllSlots}$ of the available resources for sidelink transmission. Optionally, the UE determines, according to configuration information of the available resources for sidelink transmission, the number $c_{SLSlots}$ of resources (or slots) of the available resources for sidelink transmission in the second configuration period $d_{AllSlots}$.

In step S302, the user equipment receives configuration information of a sidelink configured grant transmitted by the base station gNB.

Optionally, the configuration information of the sidelink configured grant includes a period Periodicity of the configured grant.

Optionally, the configuration information of the sidelink configured grant includes the number HARQProcesses of HARQ processes of the configured grant.

Optionally, the configuration information of the sidelink configured grant includes HARQ process ID offset indication information $H_{ProcID}$ of the configured grant.

In step S303, the user equipment transmits a PSCCH and a corresponding PSSCH.

Optionally, the user equipment uses a resource indicated by the sidelink configured grant to transmit the PSCCH and the corresponding PSSCH.

In step S304, the user equipment determines an HARQ process ID of transmission of the PSCCH and the corresponding PSSCH according to the $b_{ResourcePool}$ and/or the $a_{slot}$ and/or the $d_{AllSlots}$ and/or the $c_{SLSlots}$ and/or the Periodicity and/or the $H_{ProcID}$ and/or the HARQProcesses.

Optionally, the HARQ process ID of the transmission of the PSCCH and the corresponding PSSCH represents an HARQ process ID corresponding to a first slot where the transmission of the PSCCH and the corresponding PSSCH is located (or one slot in the transmission). A logical number of the first slot (or the one slot in the transmission) in the resource pool is q.

Optionally, the HARQ process ID of the transmission of the PSCCH and the corresponding PSSCH is equal to $\lfloor q/\text{Periodicity} \rfloor$ mod HARQProcesses, or is equal to $$\left\lfloor q / \left( \text{Periodicity} \times \frac{b_{ResourcePool}}{a_{slot}} \right) \right\rfloor \mod HARQProcesses,$$

or is equal to $$\left\lfloor q / \left( \text{Periodicity} \times \frac{d_{AllSlots}}{c_{SLSlots}} \right) \right\rfloor \mod HARQProcesses,$$

or is equal to $$\left\lfloor q / \left( \text{Periodicity} \times \frac{b_{ResourcePool}}{a_{slot}} \times \frac{d_{AllSlots}}{c_{SLSlots}} \right) \right\rfloor \mod HARQProcesses,$$

or is equal to $\lfloor q/\text{Periodicity} \rfloor$ mod HARQProcesses+$H_{ProcID}$, or is equal to $$\left\lfloor q / \left( \text{Periodicity} \times \frac{b_{ResourcePool}}{a_{slot}} \right) \right\rfloor \mod HARQProcesses + H_{ProcID},$$

or is equal to $$\left\lfloor q / \left( \text{Periodicity} \times \frac{d_{AllSlots}}{c_{SLSlots}} \right) \right\rfloor \mod HARQProcesses + H_{ProcID},$$

or is equal to $$\left\lfloor q / \left( \text{Periodicity} \times \frac{b_{ResourcePool}}{a_{slot}} \times \frac{d_{AllSlots}}{c_{SLSlots}} \right) \right\rfloor \mod HARQProcesses + H_{ProcID}.$$

Embodiment 4

The method performed by user equipment according to Embodiment 4 of the present invention is described in detail below in conjunction with the basic procedure diagram shown in FIG. 4.

As shown in FIG. 4, in Embodiment 4 of the present invention, steps performed by the user equipment include the following steps.

In step S301, the user equipment receives sidelink configuration information transmitted by a base station gNB.

Optionally, the sidelink configuration information comprises configuration information of a sidelink resource pool. Optionally, the configuration information of the sidelink resource pool includes a first configuration period (or a first configuration length, or the length of a first configured bitmap) $b_{ResourcePool}$. Optionally, the UE determines, according to the configuration information of the sidelink resource pool, the number $a_{slot}$ of available resources (or slots) for sidelink transmission in the first configuration period $b_{ResourcePool}$.

Optionally, the sidelink configuration information comprises a second configuration period (or a second configuration length, or the length of a second configured bitmap) $d_{AllSlots}$ of the available resources for sidelink transmission.

Optionally, the UE determines, according to configuration information of the available resources for sidelink transmission, the number $c_{SLSlots}$ of resources (or slots) of the available resources for sidelink transmission in the second configuration period $d_{AllSlots}$.

In step S302, the user equipment receives configuration information of a sidelink configured grant transmitted by the base station gNB.

Optionally, the configuration information of the sidelink configured grant includes a period Periodicity of the configured grant.

Optionally, the configuration information of the sidelink configured grant includes the number HARQProcesses of HARQ processes of the configured grant.

Optionally, the configuration information of the sidelink configured grant includes HARQ process ID offset indication information $H_{ProcID}$ of the configured grant.

In step S303, the user equipment transmits a PSCCH and a corresponding PSSCH.

Optionally, the user equipment uses a resource indicated by the sidelink configured grant to transmit the PSCCH and the corresponding PSSCH.

In step S304, the user equipment determines an HARQ process ID of transmission of the PSCCH and the corresponding PSSCH according to the $b_{ResourcePool}$ and/or the $a_{slot}$ and/or the $d_{AllSlots}$ and/or the $c_{SLSlots}$ and/or the Periodicity and/or the $H_{ProcID}$ and/or the HARQProcesses.

Optionally, the HARQ process ID of the transmission of the PSCCH and the corresponding PSSCH represents an HARQ process ID corresponding to a first slot where the transmission of the PSCCH and the corresponding PSSCH is located (or one slot in the transmission). An offset of the first slot (or the one slot in the transmission) relative to a first slot in DFN #0 (or a number, and in this case, it is indicated that the first slot in DFN #0 is a slot having a number equal to 0) is represented by $Current_{slot}$ or $Current_{slot}$=DFN× numberOfSlotsPerDirectFrame+slotNumberIntheDi-rectFrame. DFN represents a frame number of a direct frame where the first slot (or the one slot in the transmission) is located; numberOfSlotsPerDirectFrame represents the number of slots in each direct frame; slotNumberIntheDi-rectFrame represents a slot number of the first slot (or the one slot in the transmission) in DFN.

Optionally, the HARQ process ID of the transmission of the PSCCH and the corresponding PSSCH is equal to $\lfloor Current_{slot}/Periodicity \rfloor$ mod HARQProcesses, or is equal to $$\left\lfloor Current_{slot}/\left(Periodicity \times \frac{b_{ResourcePool}}{a_{slot}}\right)\right\rfloor \mod HARQProcesses,$$

or is equal to $$\left\lfloor Current_{slot}/\left(Periodicity \times \frac{d_{AllSlots}}{c_{SLSlots}}\right)\right\rfloor \mod HARQProcesses,$$

or is equal to $$\left\lfloor Current_{slot}/\left(Periodicity \times \frac{b_{ResourcePool}}{a_{slot}} \times \frac{d_{AllSlots}}{c_{SLSlots}}\right)\right\rfloor \mod HARQProcesses,$$

or is equal to $\lfloor Current_{slot}/Periodicity \rfloor$ mod HARQProcesses+$H_{ProcID}$, or is equal to $$\left\lfloor Current_{slot}/\left(Periodicity \times \frac{b_{ResourcePool}}{a_{slot}}\right)\right\rfloor \mod HARQProcesses + H_{ProcID},$$

or is equal to $$\left\lfloor Current_{slot}/\left(Periodicity \times \frac{d_{AllSlots}}{c_{SLSlots}}\right)\right\rfloor \mod HARQProcesses + H_{ProcID},$$

or is equal to $$\left\lfloor Current_{slot}/\left(Periodicity \times \frac{b_{ResourcePool}}{a_{slot}} \times \frac{d_{AllSlots}}{c_{SLSlots}}\right)\right\rfloor$$
$$\mod HARQProcesses + H_{ProcID}.$$

Figure 5:
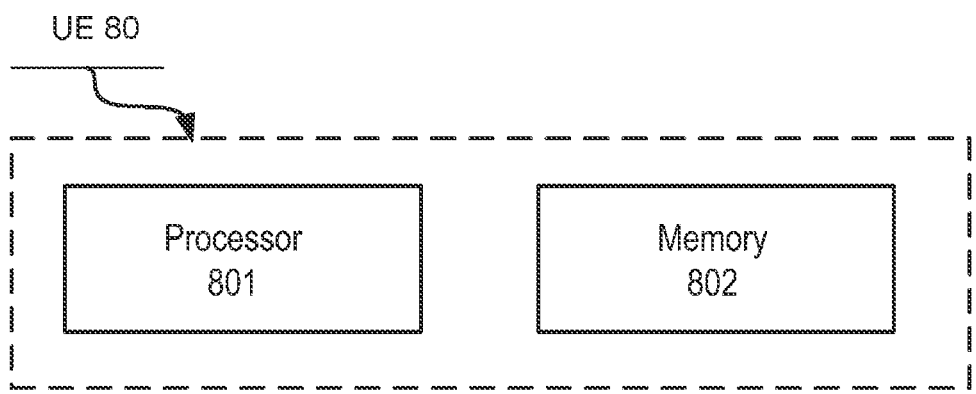
FIG. 5 is a block diagram showing user equipment according to an embodiment of the present invention.

FIG. 5 is a block diagram showing the user equipment (UE) involved in the present invention. As shown in FIG. 5, the user equipment (UE) 80 includes a processor 801 and a memory 802. The processor 801 may include, for example, a microprocessor, a microcontroller, an embedded processor, and the like. The memory 802 may include, for example, a volatile memory (such as a random access memory (RAM)), a hard disk drive (HDD), a non-volatile memory (such as a flash memory), or other memories. The memory 802 stores program instructions. The instructions, when run by the processor 801, can perform the foregoing method performed by user equipment as described in detail in the present invention.

The methods and related equipment according to the present invention have been described above in combination with preferred embodiments. It should be understood by those skilled in the art that the methods shown above are only exemplary, and the above embodiments can be combined with one another as long as no contradiction arises. The methods of the present invention are not limited to the steps or sequences illustrated above. The network node and user equipment illustrated above may include more modules. For example, the network node and user equipment may further include modules that can be developed or will be developed in the future to be applied to a base station, an MME, or UE, and the like. Various identifiers shown above are only exemplary, and are not meant for limiting the present invention. The present invention is not limited to specific information elements serving as examples of these identifiers. Those skilled in the art can make various alterations and modifications according to the teachings of the illustrated embodiments.

It should be understood that the above-described embodiments of the present invention may be implemented by software, hardware, or a combination of software and hardware. For example, various components inside the base station and the user equipment in the above embodiments may be implemented through various devices, which include, but are not limited to, analog circuit devices, digital circuit devices, digital signal processing (DSP) circuits, programmable processors, application specific integrated circuits (ASICs), field programmable gate arrays (FPGAs), programmable logic devices (CPLDs), and the like.

In this application, the "base station" may refer to a mobile communication data and control exchange center with large transmission power and a wide coverage area, including functions such as resource allocation and scheduling, data reception and transmission. "User equipment"

may refer to a user mobile terminal, for example, including terminal devices that can communicate with a base station or a micro base station wirelessly, such as a mobile phone, a laptop computer, and the like.

In addition, the embodiments of the present invention disclosed herein may be implemented on a computer program product. More specifically, the computer program product is a product provided with a computer-readable medium having computer program logic encoded thereon. When executed on a computing device, the computer program logic provides related operations to implement the above technical solutions of the present invention. When executed on at least one processor of a computing system, the computer program logic causes the processor to perform the operations (methods) described in the embodiments of the present invention. Such setting of the present invention is typically provided as software, codes and/or other data structures provided or encoded on the computer readable medium, e.g., an optical medium (e.g., compact disc read-only memory (CD-ROM)), a flexible disk or a hard disk and the like, or other media such as firmware or micro codes on one or more read-only memory (ROM) or random access memory (RAM) or programmable read-only memory (PROM) chips, or a downloadable software image, a shared database and the like in one or more modules. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The aforementioned general purpose processor or each circuit may be configured by a digital circuit or may be configured by a logic circuit. Furthermore, when advanced technology capable of replacing current integrated circuits emerges due to advances in semiconductor technology, the present invention can also use integrated circuits obtained using this advanced technology.

While the present invention has been illustrated in combination with the preferred embodiments of the present invention, it will be understood by those skilled in the art that various modifications, substitutions, and alterations may be made to the present invention without departing from the spirit and scope of the present invention. Therefore, the present invention should not be limited by the above-described embodiments, but should be defined by the appended claims and their equivalents.

The invention claimed is:

1. A user equipment, comprising:
reception circuitry configured to receive higher layer parameters comprising: a ConfiguredGrantConfig, a locationAndBandwidth, and an offsetToCarrier from a base station, wherein:
the ConfiguredGrantConfig comprises an rrc-ConfiguredUplinkGrant, an rbg-size, and a resource Allocation,
the resource Allocation is configured as an uplink resource allocation type 0,
the rrc-ConfiguredUplinkGrant comprises a frequencyDomainAllocation,
the frequencyDomainAllocation is a bit string of size 18 bits,
a starting resource block index ($N_{BWP,i}^{start}$) of an uplink bandwidth part (BWP) is determined based on the locationAndBandwidth and the offsetToCarrier,
a resource block size ($N_{BWP,i}^{size}$) of the uplink BWP is determined based on the size locationAndBandwidth,
a nominal resource block group (RBG) size (P) is determined based on the $N_{BWP,i}^{size}$ and the rbg-Size, and
a number of RBGs ($N_{RBG}$) is determined as $N_{RBG}=\lceil (N_{BWP,i}^{size}+(N_{BWP,i}^{start} \bmod P))/P \rceil$, $\lceil$ and $\rceil$ indicating a ceiling function, mod indicating modulo operation;
determination circuitry configured to determine a frequency domain resource allocation for the uplink resource allocation type 0 by an $N_{RBG}$ Least Significant Bits sequence in the frequencyDomainAllocation, wherein the $N_{RBG}$ Least Significant Bits sequence starts from a $(19-N_{RBG})^{th}$ bit of the frequencyDomainAllocation, and
transmission circuitry configured to transmit a Physical Uplink Shared Channel based on the frequency domain resource allocation.

2. A base station apparatus, comprising:
transmission circuitry configured to transmit higher layer parameters comprising: a ConfiguredGrantConfig, a locationAndBandwidth, and an offsetToCarrier, wherein:
the ConfiguredGrantConfig comprises an rrc-ConfiguredUplinkGrant, an rbg-size, and a resourceAllocation,
the resourceAllocation is configured as an uplink resource allocation type 0,
the rrc-ConfiguredUplinkGrant comprises a frequencyDomainAllocation,
the frequencyDomainAllocation is a bit string of size 18 bits,
a starting resource block index ($N_{BWP,i}^{start}$) of an uplink bandwidth part (BWP) is determined based on the locationAndBandwidth and the offsetToCarrier,
a resource block size ($N_{BWP,i}^{size}$) of the uplink BWP is determined based on the locationAndBandwidth,
a nominal resource block group (RBG) size (P) is determined based on the $N_{BWP,i}^{size}$ and the rbg-Size,
a number of RBGs ($N_{RBG}$) is determined as $N_{RBG}=\lceil (N_{BWP,i}^{size}+(N_{BWP,i}^{start} \bmod P))/P \rceil$,
$\lceil$ and $\rceil$ indicating a ceiling function, mod indicating modulo operation, and
a frequency domain resource allocation for the uplink resource allocation type 0 is determined by an $N_{RBG}$ Least Significant Bits sequence in the frequencyDomainAllocation, wherein the $N_{RBG}$ Least Significant Bits sequence starts from a $(19-N_{RBG})^{th}$ bit of the frequencyDomainAllocation; and
reception circuitry configured to receive a Physical Uplink Shared Channel based on the frequency domain resource allocation.

3. A method performed by a user equipment, comprising:
receiving higher layer parameters comprising: a ConfiguredGrantConfig, a locationAndBandwidth, and an offsetToCarrier from a base station, wherein:
the ConfiguredGrantConfig comprises an rrc-ConfiguredUplinkGrant, an rbg-size, and a resource Allocation,
the resourceAllocation is configured as an uplink resource allocation type 0, the rrc-ConfiguredUplinkGrant comprises a frequencyDomainAllocation, the frequencyDomainAllocation is a bit string of size 18 bits, a starting resource block index ($N_{BWP,i}^{start}$) of an uplink bandwidth part (BWP) is determined based on the locationAndBandwidth and the offsetToCarrier, a resource block size ($N_{BWP,i}^{size}$) of the uplink BWP is determined based on the locationAndBandwidth, a nominal resource block group (RBG) size (P) is determined based on the $N_{BWP,i}^{size}$ and the rbg-Size, and a number of RBGs ($N_{RBG}$) is determined as $N_{RBG}=\lceil (N_{BWP,i}^{size}+(N_{BWP,i}^{start} \bmod P))/P \rceil$, $\lceil$ and $\rceil$ indicating a ceiling function, mod indicating modulo operation;

determining a frequency domain resource allocation for the uplink resource allocation type 0 by an $N_{RBG}$ Least Significant Bits sequence in the frequencyDomainAllocation, wherein the $N_{RBG}$ Least Significant Bits sequence starts from a $(19-N_{RBG})^{th}$ bit of the frequencyDomainAllocation; and transmitting a Physical Uplink Shared Channel based on the frequency domain resource allocation.

\* \* \* \* \*